US010859989B2

(12) United States Patent
Troesch et al.

(10) Patent No.: US 10,859,989 B2
(45) Date of Patent: Dec. 8, 2020

(54) TRANSPORT SYSTEM AND METHOD OF CONTROLLING SAME

(71) Applicant: Inventio AG, Hergiswil (CH)

(72) Inventors: Florian Troesch, Zurich (CH); Paul Friedli, Remetschwil (CH)

(73) Assignee: Inventio AG

( * ) Notice: Subject to any disclaimer, the term of this patent is extended or adjusted under 35 U.S.C. 154(b) by 0 days.

(21) Appl. No.: 15/532,276

(22) PCT Filed: Dec. 2, 2015

(86) PCT No.: PCT/EP2015/078273
§ 371 (c)(1),
(2) Date: Jun. 1, 2017

(87) PCT Pub. No.: WO2016/087481
PCT Pub. Date: Jun. 9, 2016

(65) Prior Publication Data
US 2017/0357229 A1 Dec. 14, 2017

(30) Foreign Application Priority Data
Dec. 2, 2014 (EP) .................................. 14195826

(51) Int. Cl.
*G05B 19/042* (2006.01)
*B66B 1/46* (2006.01)
(Continued)

(52) U.S. Cl.
CPC .......... *G05B 19/042* (2013.01); *B66B 1/2408* (2013.01); *B66B 1/468* (2013.01);
(Continued)

(58) Field of Classification Search
CPC .......... G05B 19/042; G05B 2219/2659; G05B 2219/2621; B66B 1/2408; B66B 25/003;
(Continued)

(56) References Cited

U.S. PATENT DOCUMENTS 4,979,594 A 12/1990 Begle et al.
5,749,443 A 5/1998 Romao
(Continued)

FOREIGN PATENT DOCUMENTS

CN 101249914 A 8/2008
WO 2009/132696 A1 11/2009
(Continued)

*Primary Examiner* — Ziaul Karim
(74) *Attorney, Agent, or Firm* — Bressler, Amery and Ross; Pierre R. Yanney

(57) ABSTRACT

A transport system which is suited for providing a number of person-transport services has a conveyor arrangement, a number of stationary stations and a controllable drive arrangement. A control unit system controls operation of the drive arrangement. The control unit system is configured to control a multitude of person-transport services which are requestable via an interface arrangement by non-touch, acoustical or electromagnetic signals. The number of such services is at least 50% of the person-transport services which may be provided by the transport system.

14 Claims, 9 Drawing Sheets

(51) Int. Cl.
*B66B 1/24* (2006.01)
*B66B 25/00* (2006.01)
*E05F 15/73* (2015.01)
*B66B 9/00* (2006.01)
*B66B 21/02* (2006.01)
*B66B 21/10* (2006.01)

(52) U.S. Cl.
CPC .............. *B66B 25/003* (2013.01); *B66B 9/00* (2013.01); *B66B 21/02* (2013.01); *B66B 21/10* (2013.01); *B66B 2201/4638* (2013.01); *B66B 2201/4646* (2013.01); *B66B 2201/4653* (2013.01); *B66B 2201/4676* (2013.01); *E05F 15/73* (2015.01); *G05B 2219/2621* (2013.01); *G05B 2219/2659* (2013.01)

(58) Field of Classification Search
CPC ......... B66B 1/468; B66B 21/10; B66B 21/02; B66B 9/00; B66B 2201/4676; B66B 2201/4653; B66B 2201/4646; B66B 2201/4638; E05F 15/73
USPC ........................................................ 700/275
See application file for complete search history.

(56) References Cited

U.S. PATENT DOCUMENTS

| | | | |
|---|---|---|---|
| 6,868,945 | B2 | 3/2005 | Schuster et al. |
| 7,350,626 | B2* | 4/2008 | Lence ................ B66B 1/34 187/247 |
| 7,610,995 | B2* | 11/2009 | Ylinen ................ B66B 1/34 187/381 |
| 8,485,317 | B2 | 7/2013 | Gerstenkorn et al. |
| 2003/0171084 | A1* | 9/2003 | Shefet ................ A22C 11/127 452/35 |
| 2013/0103200 | A1* | 4/2013 | Tucker ................ G01C 21/206 700/275 |
| 2013/0173062 | A1* | 7/2013 | Koenig-Richardson .................... G06Q 10/00 700/275 |
| 2015/0158694 | A1* | 6/2015 | Finschi ................ B66B 9/00 187/247 |
| 2016/0016756 | A1* | 1/2016 | Elomaa ................ B66B 1/3446 700/275 |
| 2020/0031615 | A1* | 1/2020 | Hsu ................ B66B 1/3407 |

FOREIGN PATENT DOCUMENTS

| | | |
|---|---|---|
| WO | 2014/049202 A1 | 4/2014 |
| WO | 2014/072588 A1 | 5/2014 |
| WO | 2014/076369 A1 | 5/2014 |
| WO | 2014/096529 A1 | 6/2014 |

* cited by examiner

TRANSPORT SYSTEM AND METHOD OF CONTROLLING SAME

CROSS-REFERENCE TO RELATED APPLICATIONS

This application is the national phase application under 35 U.S.C. § 371 claiming the benefit of priority based on International Patent Application No. PCT/EP2015/078273, filed on Dec. 2, 2015, which claims the benefit of priority based on European Patent Application No. 14195826.4, filed on Dec. 2, 2014. The contents of each of these applications are herein incorporated by reference.

FIELD OF THE INVENTION

Transport systems which are suited for person transport services are very often accessible to many people, even to the public. Locations, especially public locations, where a lot of people meet at a transport system as addressed, may be critical locations with respect to transmission of diseases, especially of highly infectious illnesses as have come up in the near past and which may spread out rapidly and worldwide due to high mobility.

SUMMARY OF THE INVENTION

It is an object of the present invention to reduce the risk of infection for people making use of a transport system as addressed.

Therefore, there is proposed a transport system suited for providing a number of person transport services which comprises at least one conveyor arrangement, latter comprising a stationary conveyor track and a conveyor, movable along the addressed conveyor track. The system further comprises a number of stationary stations which are assigned to predetermined positions along the conveyor track. As an example, such stationary station may be accessed from a predetermined position along the addressed conveyor track.

The transport system further comprises a controllable drive arrangement which is operationally connected to the conveyor arrangement. The controllable drive arrangement is provided for at least one of for driving the conveyor and of for controlling access from the conveyor to the stationary stations. The controllable drive arrangement has a control input for first signals which control operation of the drive arrangement.

The transport system further comprises a control unit system which has an output for second signals, wherefrom the addressed first signals depend. The addressed output is operationally connected to the addressed control input of the controllable drive arrangement. The control unit system has further a command input for third signals, wherefrom the second signals depend.

The control unit system is configured to control, in dependency from respective ones of the addressed third signals to the command input, the drive arrangement by the addressed second signals in a manner that the conveyor arrangement performs respectively one service—or more than one—out of a first group of services. This first group of services, which need not necessarily be all transport services, consists of a predetermined first number $N_1$ of services, i.e. service members. The first group of $N_1$ service members includes a second group of services, i.e. service members which are person transport services. The second group consists of a second predetermined number $N_2$ of person transport service members from and to stationary stations. There is valid $$N_2 \leq N_1.$$

If $N_2$ is equal to $N_1$ all the services for the control of which the control unit system is configured, are person-transport services.

The transport system further comprises a stationary interface arrangement which has an output for fourth signals, wherefrom the addressed third signals depend. The output of the stationary interface arrangement is operationally connected to the command input of the control unit system. The stationary interface arrangement has further an input which is adapted to accept exclusively non-touch, acoustical or electromagnetic request signals.

A third group of services defined in the control unit system consists of a third number $N_3$ of service members. These members define services provided by the conveyor arrangement which are performed by the conveyor arrangement upon the addressed request signals which are non-touch, acoustical or electromagnetic signals. The third group includes at least 50% of the services, i.e. service members of the second group, and there is valid:

$$N_3 \leq N_1.$$

Thus, at least 50% of the person-transport services which may be performed by the conveyor arrangement under control of the control unit system are requestable by non-touch, acoustical or electromagnetic request signals.

Thereby, there is achieved that persons who request one of a predominant number of person-transport services provided by the overall system, need not touch a command board as of fixtures at the transport system. With respect to disease transmission such command fixtures, e.g. at elevators, are loci where direct touching by a lot of persons is focused at and are thus most critical.

Please note, according the respective definition below, that we understand throughout the present description and claims under "touching" or "touch" touching and respectively a touch performed directly by a person as e.g. directly by a finger, without making use of an active signal generating means which is only person controlled. Accordingly we have defined "non-touch" as non-direct touch by a person i.e. making use of an active, signal generating technical means which is only controlled by a person.

The situation as just addressed is avoided by the fact according to the addressed transport system that at least 50% of the person-transport services provided by the transport system may be requested in a non-touch manner.

In an embodiment of the transport system, which may be combined with any of the subsequently addressed embodiments, unless in contradiction, the second group, namely the group of person-transport services, consists of at least 90% of the first group services.

This takes into account that in most transport systems suited for person-transport, most services provided are person transport services and only a few services are non-person transport services, as e.g. services for maintenance.

In a further good embodiment, which may be combined with any preaddressed system-embodiment and such embodiments still to be addressed, unless in contradiction, the second group comprises services, person-transport services, which are performed by the conveyor arrangement exclusively upon the addressed request signals i.e. non-touch signals. Thus, a person requesting one of the just addressed services may not freely decide, whether such request shall be entered by fixtures or in a non-touch manner. These services are only requestable by non-touch request signals.

In a further embodiment of the embodiment just addressed, at least 50% of the members of the second group, i.e. of the person transport services, are performed exclusively upon the request signals, i.e. the non-touch signals.

In a further embodiment of the system, which may be combined with any system embodiment already addressed and still to be addressed, unless in contradiction, at least 50% of the third group, even at least 70% or even at least 90% are performed exclusively upon i.e. only upon the addressed non-touch request signals.

In a further embodiment, which may be combined with any of the preaddressed embodiments of the system as well as with any embodiment still to be addressed, unless in contradiction, the transport system further comprises at least one portable communication device—portable by a person—which is adapted for communication with the addressed stationary interface arrangement via the addressed acoustical and/or electromagnetic signals.

In one embodiment of the just addressed embodiments of the transport system the portable communication device is one of a DPA, mobile phone, touch pad, portable computer, card with a chip.

In a further embodiment of the transport system, which may be combined with any of the preaddressed embodiments or embodiments still to be addressed, unless in contradiction, there is provided an arrangement of position-identification units which identify a position of the addressed portable communication unit and which is adapted to transmit a signal to the stationary interface arrangement, which signal is indicative for the addressed position.

By transmitting, generically spoken, to the transport system the instantaneous position of the portable communication unit, in fact the position of the person carrying the portable communication unit, the transport system is enabled to optimize selection of a respective transport service for that person by taking their instantaneous position into account.

In a further embodiment of the transport system, which may be combined with any of the preaddressed embodiments, unless in contradiction, the conveyor arrangement of the transport system comprises at least one of
- an elevator
- a band conveyor
- an escalator
- a door with a controllable drive for opening and closing the doors.

The above mentioned object is further addressed by the method of controlling a transport system which is suited for providing a number of person-transport services, in dependency of service requests by persons. This method comprises the step of inputting request information of requests for at least 50% of the addressed person-transport services to the transport system by non-touch, acoustical or electromagnetic signals, i.e. in a respective non-touch manner.

In a variant of the addressed method which may be combined with any of the subsequent variants of the method, unless in contradiction, the request information of requests for the addressed at least 50% of the person-transport services to the transport system may exclusively i.e. only be input by the addressed non-touch signals, i.e. in a non-touch manner.

In a further variant of the method, which may be combined with any preaddressed variant and variant still to be addressed, unless in contradiction, the method comprises inputting by the addressed non-touch signal, i.e. in non-touch inputting manner, at least information which is indicative for a start location of a person-transport service.

In a further variant of the method, which may be combined with any of the preaddressed variants and variants still to be addressed, unless in contradiction, there is performed an authentication procedure for the addressed person by the non-touch signals, i.e. in non-touch manner.

In a further variant of the method, which may be combined with any variant addressed to now, the present position of the person is identified and controlling of the transport system is performed in dependency of a result of the addressed identifying.

BRIEF DESCRIPTION OF THE DRAWINGS

The invention shall now be further exemplified with the help of figures. The figures show.

DETAILED DESCRIPTION OF EMBODIMENTS OF THE INVENTION

Figure 1:
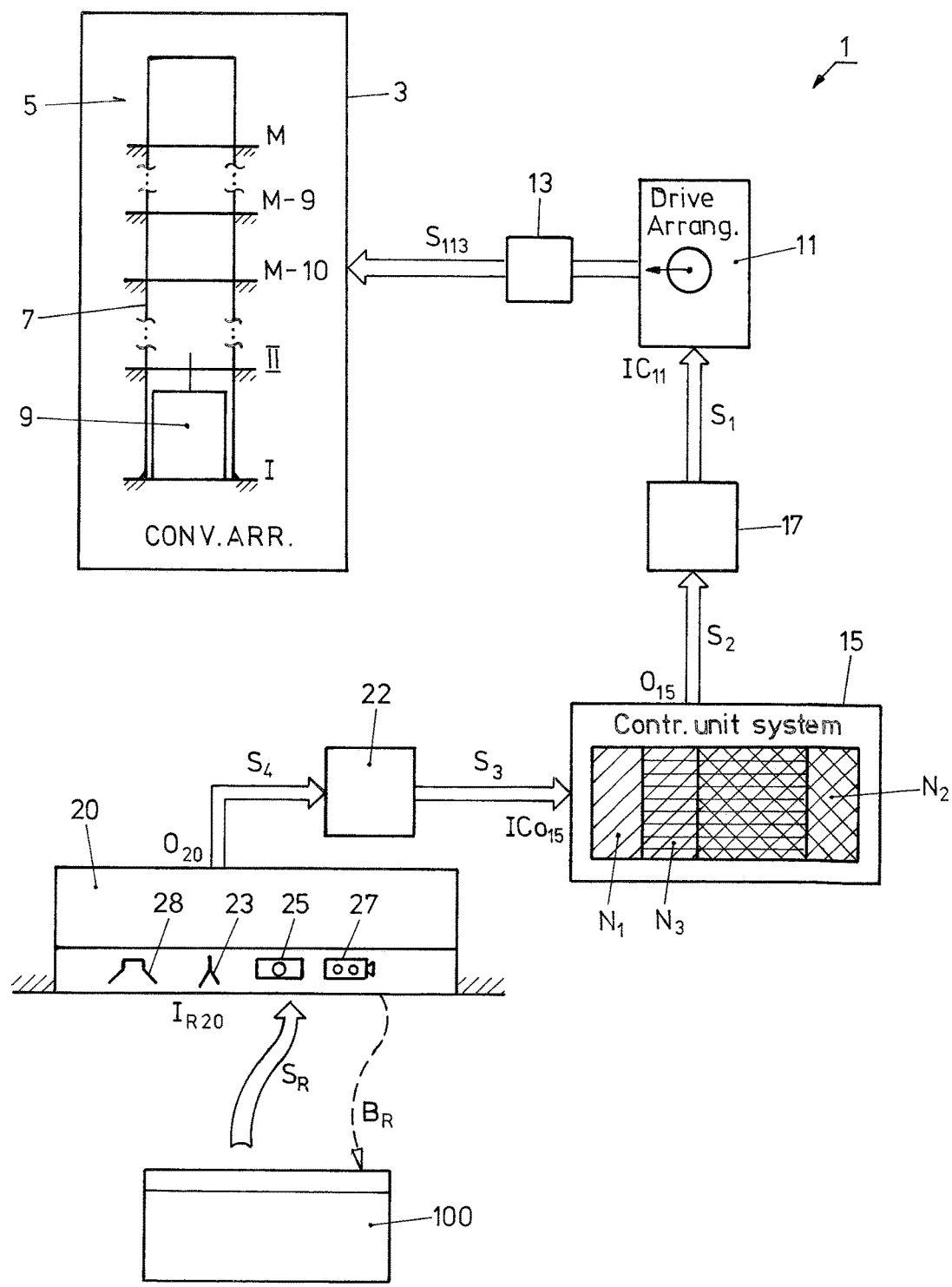
FIG. 1: By means of a signal flow/functional block diagram, simplified, an embodiment of the transport system as well as a variant of the method of controlling such transport system.

Under a generic aspect the transport system as well as the method of controlling a transport system shall be explained with the help of FIG. 1. FIG. 1 shows schematically and by means of a signal-flow/functional block diagram the addressed transport system and method for controlling.

The transport system 1 comprises at least one conveyor arrangement 3. In FIG. 1 the conveyor arrangement is shown and exemplified by an elevator 5, schematically represented within the conveyor arrangement 3. The conveyor arrangement 3 comprises a stationary conveyor track and a conveyor which is movable along the conveyor track. In context with the elevator 5 as exemplified at the conveyor arrangement 3 in FIG. 1, the conveyor track is realized by the guide-way 7 of the elevator 5, the movable conveyor is the cabin 9 of the elevator 5. The conveyor arrangement further comprises a number of stationary stations assigned to predetermined positions along the conveyor track. Thus and looking at the example of a conveyor arrangement 3 comprising an elevator 5 as schematically shown in FIG. 1 the stationary stations at predetermined positions along the guide-way 7 for the elevator cabin 9 may be the floor stations schematically shown in FIG. 1 and addressed by I, II, . . . , M-10, M-9 and M. The transport system 1 further comprises a controllable drive arrangement 11 which is operationally connected to the conveyor arrangement 3. The controllable drive arrangement 11 controls at least one of the movement of the conveyor along the conveyor track and of access from the conveyor to the stationary stations. In the example as schematically shown in FIG. 1 the controllable drive arrangement 11 establishes on one hand the movement of the elevator cabin 9 along the guide-way 7 of the elevator 5 and, most commonly, may additionally control opening and closing of access doors to the respective floor I to M, which doors may be provided at the elevator cabin and/or, stationary, at the entries to the floors according to the stationary stations and/or at entries to more remote locations at the respective floors e.g. entries to offices on respective floors, which may be as well a realization form of "stationary stations" assigned to the floor-positions.

As will be addressed below, the conveyor arrangement 3 may consist or comprise a continuously, slowly moved conveyor, e.g. a continuously moved band conveyor for persons. In such a case, the movement drive for such continuously operated conveyor needs not necessarily be a part of the drive arrangement 11 as of FIG. 1. In such a case, as an example, the drive arrangement 11 may just control opening and closing doors which allow a person transported on the continuously moved conveyor to enter or leave a respective stationary station by such door.

Therefore, the controllable drive arrangement 11 may on one hand drive the conveyor as in the case of an elevator and may additionally control access to stationary stations, but may, alternatively, only control the movement of the conveyor, e.g. if no access doors are provided between the conveyor and respective stationary stations or may—still alternatively—only control opening or closing of access doors to and from stationary stations.

As addressed above, the transport system 1 is suited for person transport services. Thus, the conveyor arrangement 3 as well as the drive arrangement 11 are constructed and operated so that one or more than one person may be comfortably transported by the conveyor arrangement 3, on one hand in a comfortable position, and, on the other hand, without being subjected to uncomfortable accelerations.

In FIG. 1 the operational connection of the controllable drive arrangement 11 to the conveyor arrangement 3 is shown by $S_{113}$, whereby the transmission block 13 represents the "operational connection", which may be realized e.g. by gear trains. Thus, the control signal $S_{113}$ exploited at the conveyor arrangement 3 needs not be directly the output drive signal of the drive arrangement 11, but is dependent therefrom.

The controllable drive arrangement 11 comprises a control input $IC_{11}$ for first signals S1, which control the operation of the drive arrangement 11.

When we referred to throughout the present description and claims "inputs" and "outputs" to or from respective functional blocks are to be understood generically for example, as an arrangement of wireless or wired input or output signal lines.

The transport system 1 further comprises a control unit system 15 which may be realized as one unit, i.e. centralized, or which may be realized by a multitude of distributed control units. Such centralized or distributed control units of system 15 may be physically located nearby or remote, i.e. far remote from the conveyor arrangement 3 and/or from the drive arrangement 11. The control unit system 15 has an output $O_{15}$ for second signals $S_2$. Thereby, the first signals $S_1$ applied to the control input $IC_{11}$ of the controllable drive arrangement 11 are dependent from the second signals $S_2$. Thus the output $O_{15}$ is operationally connected to the control input $IC_{11}$, as addressed by the operational connection 17, transmitting output signal $S_2$ to input signal $S_1$. Operational connection 17 may include e.g. converters e.g. wired/wireless converters and/or wireless/wired converters and/or amplifiers etc. as opto/electric and/or electric/optical converters.

The control unit system 15 has a command input $ICo_{15}$ for third signals $S_3$. The second signals $S_2$ output at output $O_{15}$ of control unit system 15 depend from signals $S_3$ input to command input $ICo_{15}$. The control unit system 15 is configured to control the controllable drive arrangement 11 by the output second signals $S_2$ so that the conveyor arrangement 3 performs, respectively, one out of a first group of services with a first number $N_1$ of service members.

Throughout the present description, a "service" is to be understood, for example, as a process including a movement of a movable conveyor.

The first group of services controlled by the control unit system 15 includes a second group of services, namely of person-transport services. The second group has $N_2$ person transport service members.

Throughout the present description, a "person-transport service" is to be understood, for example, as more generic "services" for the control of which the control unit system 15 is configured, a conveyance service in which the start and destination positions are assigned respectively to predetermined positions along the track of a conveyor. Thus, a "person-transport service" may always be exploited for person transport between two or more than two stationary stations assigned to the addressed positions, whereas non-person transport services may e.g. be services exploited for maintenance of the transport system, whereat the start position as well as the destination position of movement may be between respective ones of the predetermined position. Thus, with an eye on FIG. 1 and as exemplified by the elevator arrangement 5, person transport services include a transport by the elevator 5 between at least two of the floors I to M. A non-person transport service may include a movement of the conveyor 9 e.g. from a start position according to floor 1 to a destination position e.g. between the floor M-10 and the floor M-9.

Thereby, the control unit system 15 controls the drive arrangement 11 by the second signals $S_2$ so that one out of the first group of services is performed in dependency from a respective third signal $S_3$ input to the command input $ICo_{15}$.

The first group of services which may be performed by the conveyor arrangement 3 under the control of the control unit system 15 is addressed in the block representing the control unit system 15 by the area which is hatched from bottom left to top right, $N_1$.

The second group with $N_2$ person transport services is represented by the area which is hatched from bottom right to top left.

The transport system 1 further comprises a stationary interface arrangement 20 which may be realized by a single centralized interface unit or by more than one, even by a multitude of distributed interface units. The stationary interface arrangement 20 has an output $O_{20}$ for fourth signals $S_4$, wherefrom the third signals $S_3$, input to the control unit system 15 at input $ICo_{15}$ depend. Thus, the output $O_{20}$ of stationary interface arrangement 20 is operationally connected, as shown by transmission block 22, to the command input $ICo_{15}$. The signal transmission at block 22 may comprise e.g. amplifiers, converters, as e.g. opto/electric and/or electro/optical and/or optical/electric converters, wired to wireless converters and/or wireless to wired signal converters etc.

The stationary interface arrangement 20 has only an input $I_{R20}$ tailored exclusively for non-touch, acoustical or electromagnetic request signals.

This is schematically represented in the stationary interface arrangement block 20 of FIG. 1 by the symbols for an antenna 23, a photo camera 25, a video camera 27 as well as a microphone 29.

As was already addressed, we understand under the term "electromagnetic signals" optical signals in the visible and/or in the invisible spectral range as well as electromagnetic radio signals which include near-field electromagnetic signals.

Throughout the present description, the term "non-touch signals" is to be understood, for example, as signals which are non-touch directly by persons. Non-touch signals necessitate an active, signal generating technical means which is person controlled.

As represented by means of horizontal hatching in the functional block for the control unit system 15 in FIG. 1 there is provided a third group with a number $N_3$ of service members. Only this third group of services is performed by the conveyor arrangement 3 upon non-touch acoustical and/or electromagnetic request signals $S_R$ applied to the input $I_{R20}$ of the stationary interface arrangement 20. The third group of services thereby includes at least 50% of the services included in the second group, which consists of $N_2$ person-transport service members.

Thus, somehow summarizing, at least 50% of the person-transport services which are controlled by the control unit system 15 may be requested by entering to the transport system non-touch, acoustical or electromagnetic request signals.

In embodiments of the transport system and of the method of controlling same the number of person transport services within the third group of services includes more, even much more than 50% of the members of the second group, i.e. of all the person-transport services. A small number of person-transport services out of the second group may nevertheless not be requested via the stationary interface arrangement 20, e.g. special person-transport services between selected stationary stations, which may exclusively be requested by means of fixtures as of buttons or touch screen requests.

Further, the third group of services may include services which are non-person transport services and thus are not members of the second group, e.g. maintenance services.

In a good embodiment at least alt the service members of the second group $N_2$, i.e. all the person transport services, may be requested via the stationary interface unit 20 and thus in non-touch manner.

It has to be pointed out that under a generic aspect all or at least a part of the services of the third group may be requested additionally by a further stationary interface arrangement, which comprises a fixture input, i.e. an input for touch signals, be it buttons, be it a touch screen, touch sensitive sensors, e.g. capacitive sensors etc.

In an embodiment the at least 50% of the services of the third group which may be requested via the stationary interface arrangement 20 may exclusively be requested via the interface arrangement 20, thereby especially all of the person-transport services.

In the following we will describe, with an eye on generic FIG. 1, embodiments of specific parts or functions of the transport system and of the control method.

1. Conveyor Arrangement, Drive Arrangement, Person Transport Services

Figure 2:
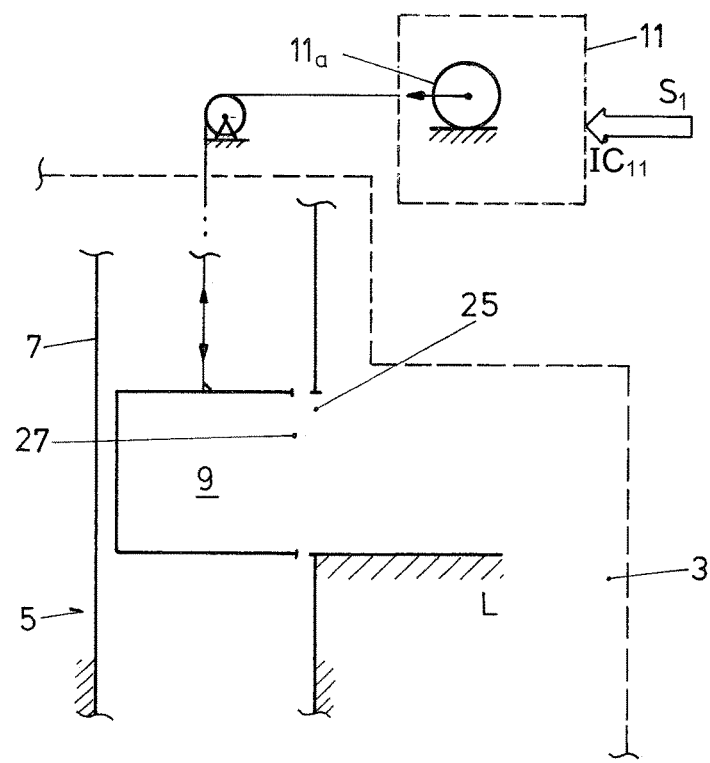
FIG. 2: most schematically and simplified, an embodiment of a conveyor arrangement and controllable drive arrangement as may be incorporated in the transport system as of FIG. 1 or used in the method.

In FIG. 2, most schematically, there is shown a first embodiment of the conveyor arrangement 3 with respective drive arrangement 11. The conveyor arrangement 3 as of FIG. 1 comprises the elevator 5 with the cabin 9 controllably movable along the guide-way 7. The cabin 9 is shown in FIG. 2 aligned to one of the floors L of a building. At the floor L which, in this embodiment, is one of the stationary stations, there is a transit opening 25. Cabin 9 as well has a transit opening 27 to be aligned with transit opening 25 at the stationary station according to floor L. Thus, in this embodiment free transition between cabin 9 and stationary station is established once the cabin 9 is in aligned position with stationary station, because no doors have to be controllably opened and closed, once the cabin 9 is in aligned position with stationary station. The drive arrangement 11 as of FIG. 1 is operationally connected to the conveyor arrangement 3 only to controllably move cabin 9 up and down.

This is represented in FIG. 2 by drive motor $11_a$, which is part of controllable drive arrangement 11.

Figure 3:
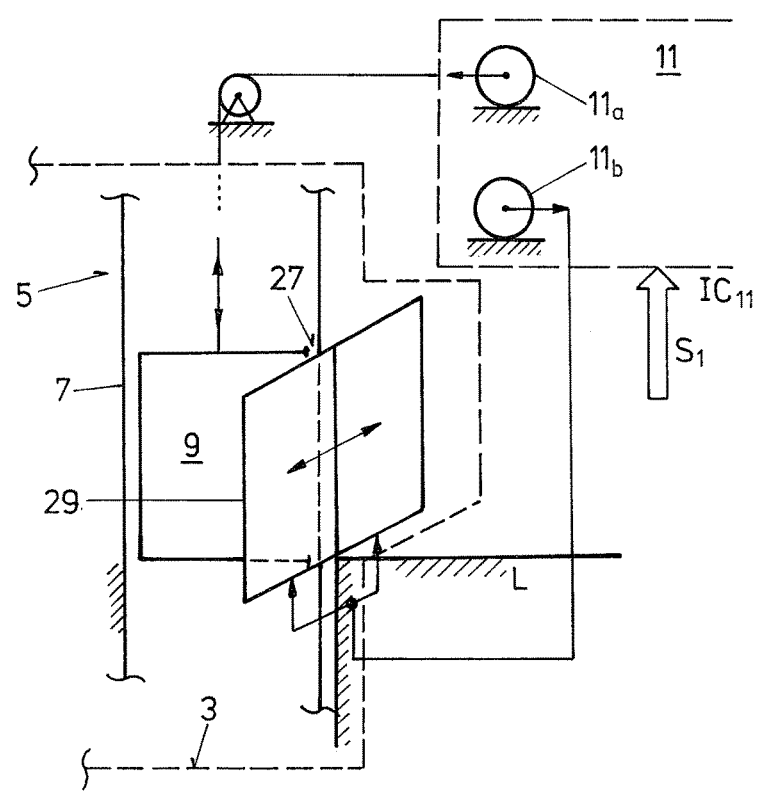
FIG. 3: in a representation in analogy to that of FIG. 2 and thus most simplified and schematically, a further embodiment of a conveyor arrangement and controllable drive arrangement as may be incorporated in the transport system as of FIG. 1 or used in the method.

FIG. 3 shows, in a representation in analogy to that of FIG. 2, a further embodiment of the conveyor arrangement 3 and the respective controllable drive arrangement 11. The conveyor arrangement 3 comprises an elevator 5 with cabin 9 movable along guide-way 7. Cabin 9, has in analogy to the embodiment of FIG. 2, a transition opening 27 and is shown in a position aligned with floor L being one of the stationary stations. The transition from or to cabin 9 at floor L is opened and closed by means of a drivingly controllable door 29 mounted to floor L and driven by a door drive $11_b$. In analogy to the embodiment of FIG. 2 the movement of cabin 9 is driven by cabin drive $11_a$. In this embodiment the controllable drive arrangement 11 thus comprises a conveyor drive, namely cabin drive $11_a$, and a door drive for a controllably driven door 29 which bars or frees entrance to or exit from cabin 9.

Figure 4:
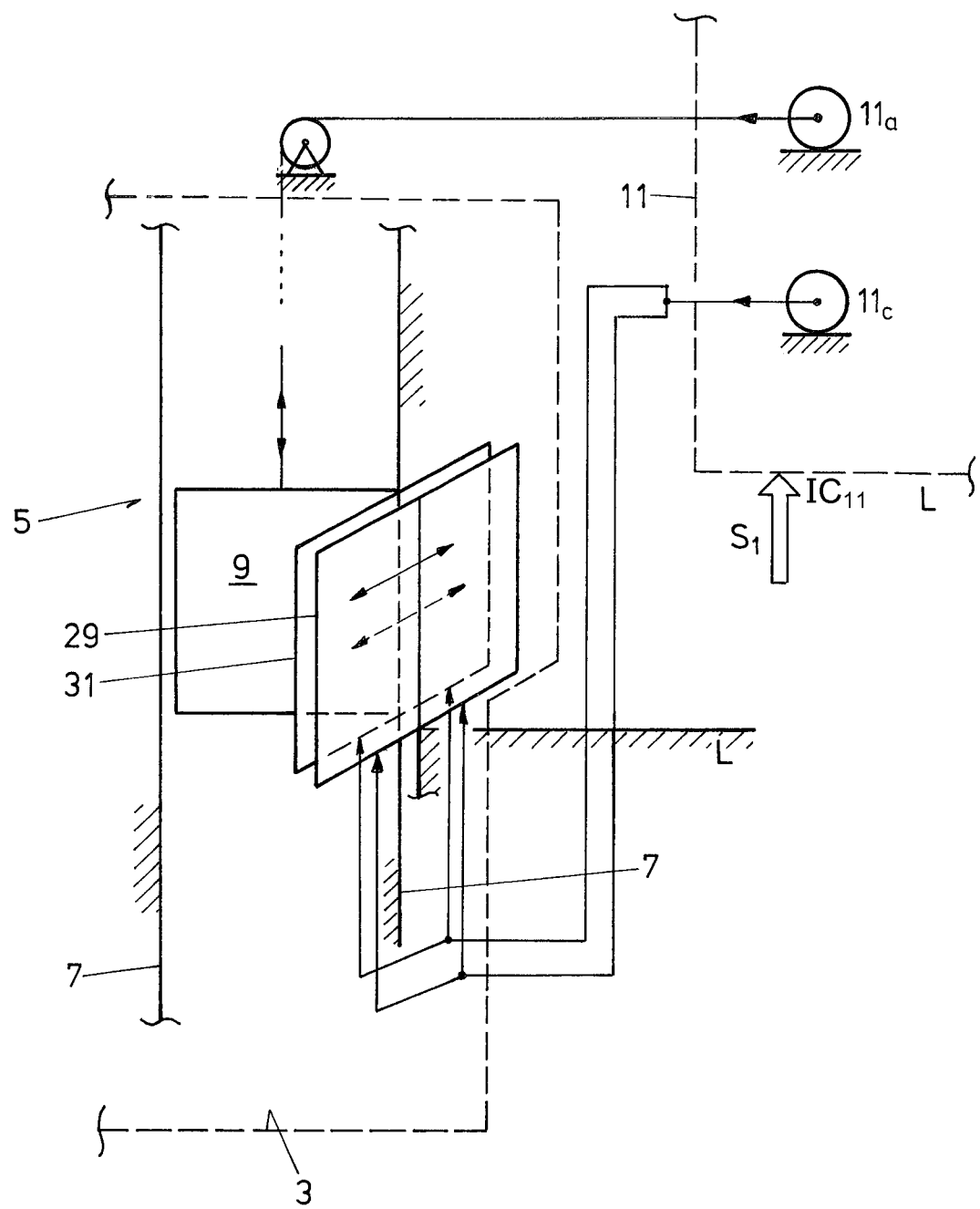
FIG. 4: in a representation in analogy to those of the FIGS. 2 and 3 and thus schematically and simplified, a further embodiment of a conveyor arrangement and controllable drive arrangement as may be incorporated in the transport system as of FIG. 1 or used in the method.

FIG. 4 shows in a representation in analogy to those of FIGS. 2 and 3 a further embodiment of the conveyor arrangement 3 and of the respective controllable drive arrangement 11. Here the elevator cabin 9, movable by cabin drive 11a along guide-way 7 has a door 31 as well which opens and closes the cabin to access or leave the cabin 9. Additionally and mounted to floor L in analogy to the embodiment of FIG. 3 the door 29 bars or frees access from cabin 9 to the stationary station as of floor L. The doors 31 and 29 are respectively controlled by one or more than one door drive 11c. Thus, in this embodiment the controllable drive arrangement 11 comprises on one hand a conveyor drive, namely cabin drive 11a, as well as a door drive, in this embodiment—11c—controllably driving both doors 31 and 29.

With an eye on the FIGS. 2 to 4 it has to be pointed out that the controllably movable doors as of 29 and 31 are considered to be part of the conveyor arrangement 3, because such doors are members which allow or bar access to a stationary station, in those embodiments to the floor L.

Figure 5:
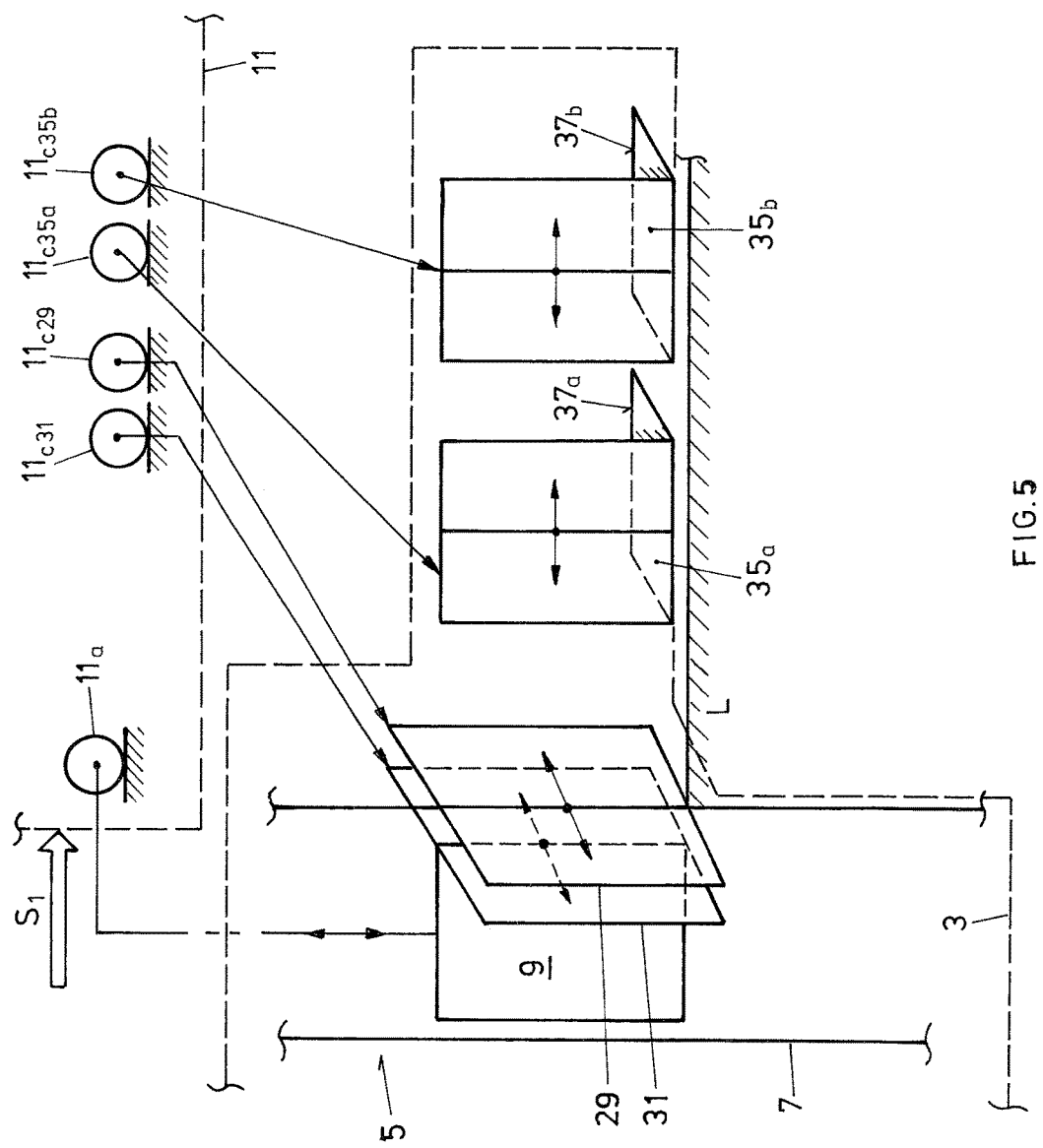
FIG. 5: in a representation in analogy to the representations of FIGS. 2 to 4 and thus schematically and simplified, a still further embodiment of a conveyor arrangement and controllable drive arrangement as may be incorporated in the transport system as of FIG. 1 or used in the method.

FIG. 5 shows an embodiment of the conveyor arrangement 3 as well as of the controllable drive 11 arrangement in a representation in analogy to those of the FIGS. 2 to 4. The elevator cabin 9 is moved up and down within guide-way 7 by means of cabin drive 11a. In analogy to the embodiment of FIG. 4 both doors 29 and 31 are provided and are, in opposition to the embodiment of FIG. 4, controllably operated or driven by a door drive $11_{C31}$ for cabin-bound door 31 and by door drive $11_{C29}$ for floor-bound door 29. In this embodiment the conveyor arrangement 3 comprises, besides of the elevator with cabin 9, guide-way 7 and the controllably operable doors 31 and 29, one, two or more than two doors 35a, 35b etc., which are accessible from floor L. Behind the doors 35a, 35b are located the areas 37a and 37b, which are accessible from cabin 9 through the respective controllably operable doors 35a, 35b. These doors are part of the conveyor arrangement 3, and the areas 37a and 37b form stationary stations assigned to predetermined positions along the conveyor track, the guide-ways 3 of the elevator 5. Thus, in this embodiment the controllable drive arrangement 3 comprises on one hand cabin drive 11a, door drives $11_{c31}$ and $11_{c29}$ as well as door drive $11_{c35a}$ and door drive $11_{c35b}$ for the respective doors $35_a$ and $35_b$. For illustrative purposes a person transport service to stationary station $37_b$ will include driving cabin 9 to floor L, opening doors 39 and 29, keeping barred or locked door $35_a$ and opening door 35b. It has to be noted, especially with an eye on FIG. 5, that the doors 35a, 35b, etc. may be located remote from cabin entrance/exit area at floor L. The position of these stationary stations 35a, 35b is nevertheless assigned to the predetermined position along guide-way 7, namely of floor L. The mutual control of the respective doors 29, 31 and 35a, 35b may be staggered in time depending from a standard time span a person takes e.g. to walk from doors 29, 31 to door 35a, 35b or inversely.

This may be considered in the signal $S_1$ applied to the control input $IC_{11}$ of the drive arrangement 11, when controlling the conveyor arrangement 3 according to a requested person transport service to stationary stations 37a or 37b.

Figure 6:
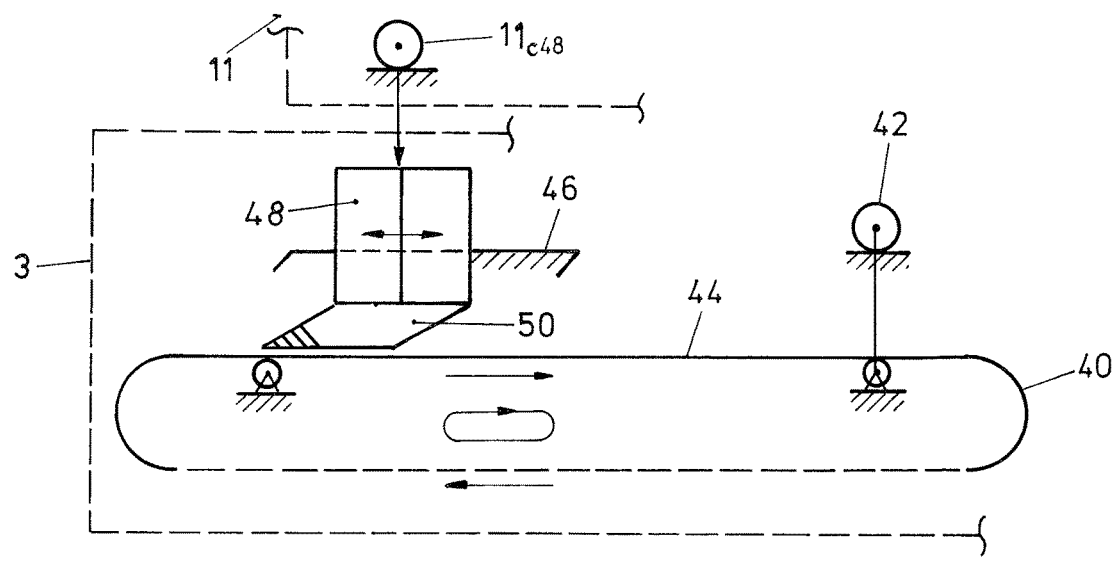
FIG. 6: most schematically and simplified, a still further embodiment of a conveyor arrangement and controllable drive arrangement as may be incorporated in the transport system as of FIG. 1 or used in the method.

FIG. 6 shows schematically and simplified, a further embodiment of or within the conveyor arrangement 3 and of the respective controllable drive arrangement 11. In this embodiment the conveyor arrangement 3 comprises on one hand a band conveyor 40 which is continuously operated and which is suited to convey persons to and from stationary stations. Customarily by such band conveyor 40 conveyance may be performed only from a position to a subsequent position subsequent in direction of conveyance, but it is absolutely possible to provide conveyance also in the inverse direction, either by a second inversely operated band conveyor (not shown in FIG. 6) or by a respectively looping band conveyor (not shown in FIG. 6).

The band conveyor 40 is continuously operated by a band drive 42. Along the conveyor track in fact defined by the path of the conveyor band 44 one, two or more than two stationary stations 46 are provided which are separate from the conveyor band 44 by a respective door 48, which is controllably opened and closed by means of a door drive $11_{c48}$. A step-in or step-out platform 50 is provided e.g. in front of door 48 to allow a person conveyed by band conveyor 40 to step out from the band or to step onto the band. Whereas continuously operated drive 42 needs not be a part of controllable drive arrangement 11, the door drive $11_{c48}$ is part of controllable drive arrangement 11.

Figure 7:
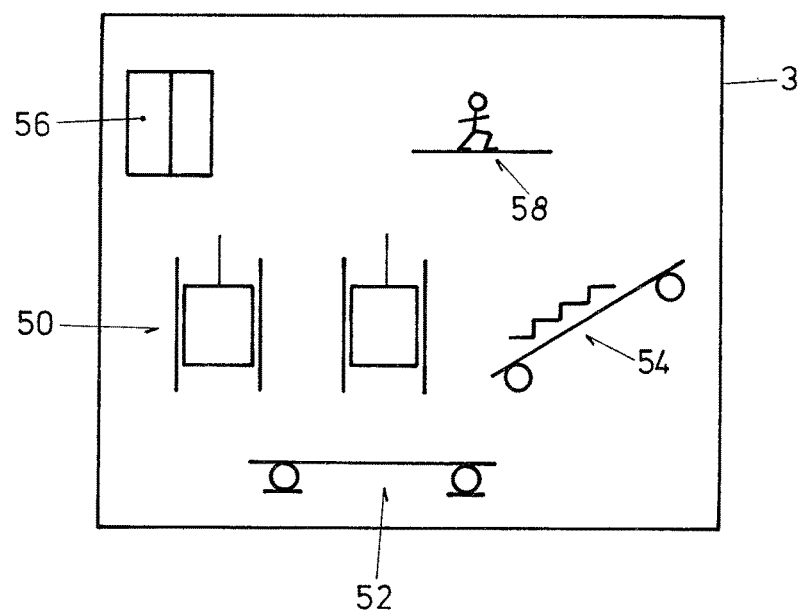
FIG. 7: most schematically, a further embodiment of a conveyor arrangement as may be incorporated in the transport system as of FIG. 1 or used in the method and comprising a multitude of different-type conveyors.

In FIG. 7 most schematically the conveyor arrangement 3 is shown with different conveyor-types which may be incorporated in such conveyor arrangement 3 as of one or more than one elevators 50, one or more than one band conveyors 52, as e.g. exemplified with the help of FIG. 6, one or more than one escalators 54, one or more than one controllably operated doors 56 and may even incorporate paths wherealong a person has to move herself as by walking, which path e.g. links one of the members 50 to 56 to another of these members.

Thus, a person transport service of conveyor arrangement 3 as schematically shown in FIG. 7 may comprise, departing from a start location, conveyance by different types of conveyors through respectively operated doors, not excluding that the requesting person will have to transit from one conveyor to the next or from one conveyor to a stationary station by herself.

2. Control Unit System

The control unit system 15 may be a centralized unit or may comprise more than one control units in mutual communication and distributed in a building which is served by such transport system or even far away therefrom, as e.g. be realized by cloud-type distributed servers. With an eye on FIG. 1 the signal $S_3$ input to the command input $ICo_{15}$ as well as the signal $S_2$ from output $O_{15}$ may be wirelessly transmitted or wired. As addressed, the architecture of the control unit system may well be that of cloud type with distributed processors and memories.

Figure 8:
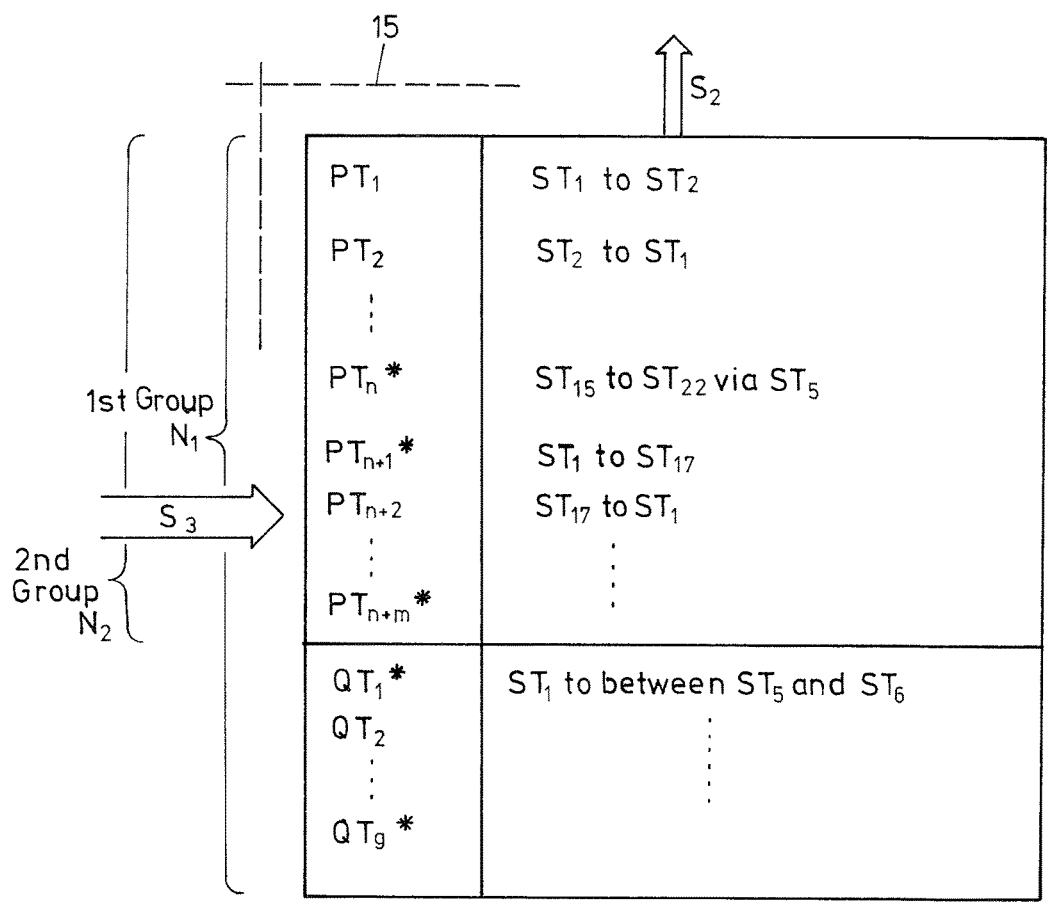
FIG. 8: in table form an embodiment of a part of a control unit system as may be incorporated in the transport system as of FIG. 1 or used in the method showing different service groups and respective control sequences which may be requested by a person.

The control unit system 15 is configured so as to control, in dependency from respective third signals $S_3$ and by means of the second signals $S_2$ output therefrom, the drive arrangement 11 as of FIG. 1. According to FIG. 8, within the control unit system 15 person-transport services $PT_1$ to $PT_{n+m}$ are defined. This may be, as represented in FIG. 8, in a centralized or distributed look-up table form. All the person-transport services $PT_1$ to $PT_{n+m}$ define such services between stationary stations ST. Thus, as exemplified the person-transport service $PT_1$ defines for a service from a station $ST_1$ to to a station $ST_2$ assigned to a predetermined position along a conveyor track in the conveyor arrangement 3 as of FIG. 1 and as exemplified by the embodiments of FIGS. 2 to 7.

As an example and as addressed in FIG. 8 such person-transport service may be more complex than just addressing a start station and a destination station. Such person-transport service may also define, by which way a destination station shall be reached. Thus, $PT_n$ of FIG. 8 defines for a person transport service from $ST_{15}$ to $ST_{22}$ which shall be performed via station $ST_5$.

Additionally and in analogy to the person-transport services $PT_1$ to $PT_{n+m}$ within control unit system 15 non-person transport services may be defined, which are addressed in FIG. 8 by $QT_1$ to $QT_q$. These QT services are not intended for person transport, but may e.g. be provided for maintenance purposes of the transport system. Thus, a first non-person transport service $QT_1$ may define for a movement of a conveyor by means of the controllable drive arrangement 11 from a start station $ST_1$ to a location between two subsequent stations $ST_5$ and $ST_6$.

All the services for which the control unit system 15 is configured, according to FIG. 8 $PT_1$ to $PT_{n+m}$ and $QT_1$ to $QT_q$, form a first group of services with a number of $N_1$ service members. The first group of services includes a second group of services which are all person-transport services. This second group consists of a number $N_2$ of person-transport service members, whereby there is valid $N_2 \leq N_1$.

$N_2=N_1$ is valid in the case where no non-person transport services QT are configured in the control unit system 15.

A third group of services out of the first and second groups are marked in FIG. 8 by *. This third group comprises at least 50% of the members of the second group, i.e. at least 50% of the person-transport services. The third group may comprise more than 50%, up to 100% of the person-transport services PT as of FIG. 8. With an eye on the fact that the services of this third group are those services which are requestable via the interface arrangement 20 of FIG. 1, the input thereof being only for non-touch, acoustical or electromagnetic request signals $S_R$, those person transport services of the second group which are not requestable via the addressed interface arrangement 20 and are thus not members of the third group of services, are in fact exceptional. These services, exceptionals, may only be requested by a further stationary interface arrangement (not shown in the figures), the input thereof being for people-touch signals.

The third group further may or may not include a part or all of the non-person transport services QT, dependent whether such non-person transport services as for maintenance purposes shall be as well requestable by non-touch signals to the stationary interface arrangement 20 as of FIG. 1 or not.

Further, a part or even all third group services may be additionally to being requestable by non-touch signals $S_R$ as of FIG. 1 via the stationary interface arrangement 20, requestable by touch request signals at a further stationary interface arrangement for touch-input signals.

3. Interface Arrangement 20

The stationary interface arrangement 20 has exclusively an input for non-touch acoustical or electromagnetic request signals $S_R$. At this interface arrangement 20 no people-touch input may be performed. The communication from the output $O_{20}$ to the input $ICo_{15}$ is established in a wired and/or wireless manner. The input $I_{R20}$ for the request signal $S_R$ may include one or more than one microphones for acoustical input signals, one or more antennas 23 for radio signal electromagnetic signals, one or more photo cameras 25 for stationary optical electromagnetic signals in the visible or invisible spectral range and/or one or more than one video camera 27 for dynamic visible or invisible optical electromagnetic signals as request signals $S_R$. The stationary interface arrangement 20 may comprise a multitude of respective interface units, which are distributed throughout the transport system or building complex wherein the transport system is installed or even remote therefrom, e.g. at each stationary station which is involved in services as defined by the third group and as stored within the control unit system 15.

At those locations, where a stationary interface unit, being part of the stationary interface arrangement 20 as of FIG. 1, is provided and in good embodiments, respective services may exclusively be requested by the non-touch request signals $S_R$.

Thus, in such good embodiments where a contact by a requesting person with an input interface to the transport system shall be avoided optimally, all stationary stations assigned to predetermine positions along the conveyor track are solely equipped with stationary interface units which are part of the stationary interface arrangement 20 of FIG. 1.

Interface units of interface arrangements 20 for radio-signal input may be part of telecommunication networks.

4. Communication by Request Signals $S_R$

The communication between a person requesting a service from the transport system 1 and the transport system 1 is performed with the help of a communication device 100 as schematically shown in FIG. 1. Dependent upon the type of non-touch signals $S_R$ which may be treated by the stationary interface arrangement 20, such communication device 100 is capable of transmitting acoustical and/or electromagnetic signals including optical signals in the visible and/or invisible spectrum of light and/or electromagnetic radio signals including nearfield electromagnetic signals.

In some embodiment a bidirectional wireless communication is established between the stationary interface arrangement 20 and the communication device 100, as addressed in FIG. 1 at $B_R$.

As was already addressed the non-touch signal input $I_{R20}$ to stationary interface arrangement 20 does not exclude that the communication device 100 to establish proper communication with the stationary interface arrangement 20 may or should be brought in contact with a sensing surface of input $I_{R20}$ of the stationary interface arrangement 20, e.g. if the communication device is a chip e.g. on a card.

By means of examples we shall now explain selected different possibilities of communication between the man operated communication device 100 and the transport system 1 via the stationary interface arrangement 20, out of a huge number of such possibilities as will become apparent to the man of ordinary skill.

Figure 9:
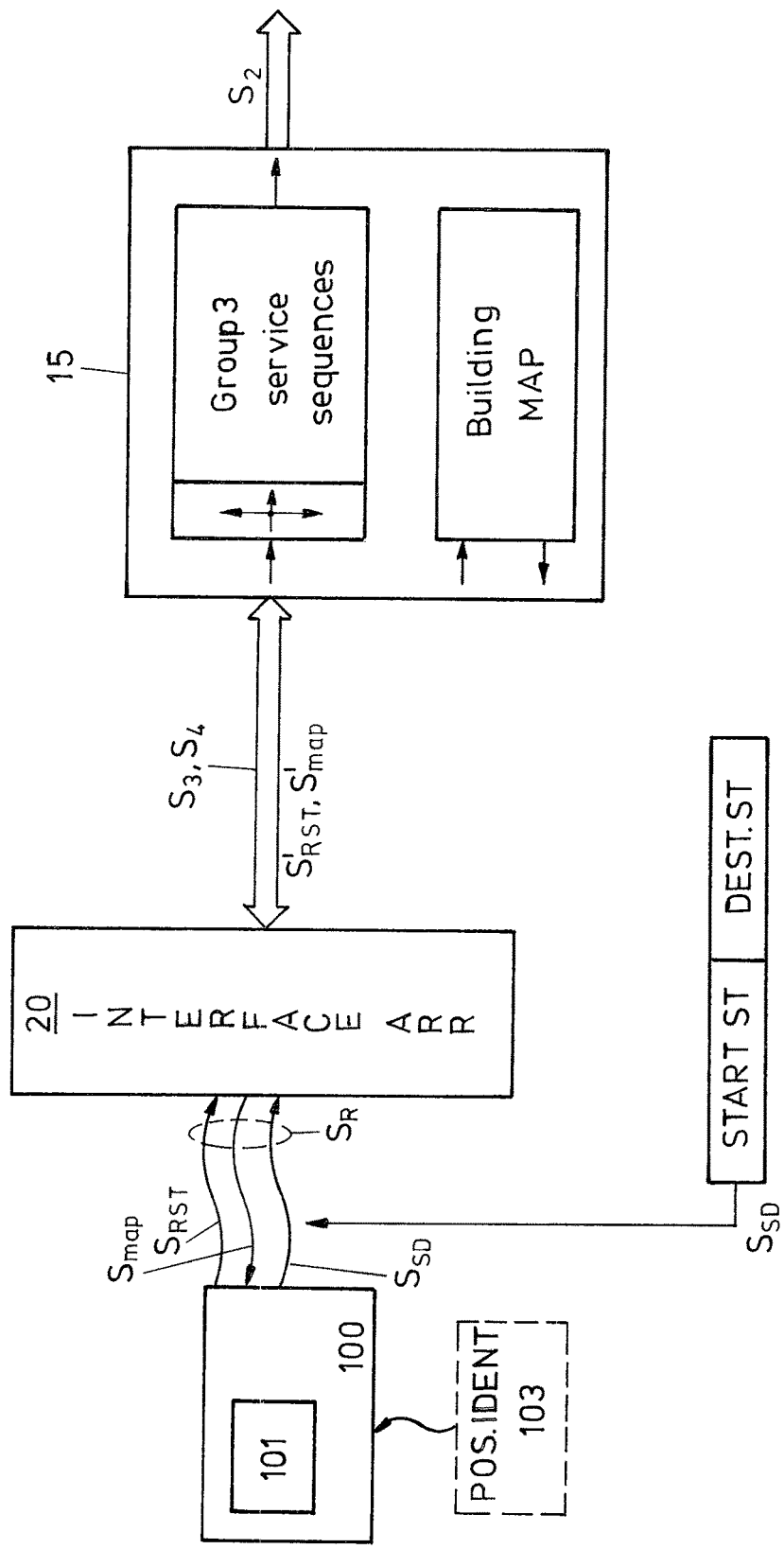
FIG. 9: in a simplified signal flow/functional block diagram, an embodiment of a part of a transport system or as may be used in the method.

In a first embodiment according to FIG. 9 the requesting signal $S_R$ comprises information about a desired start station as well as a desired destination station. Via stationary interface arrangement 20 the respective desired person-transport service is transmitted to the system control arrangement 15. Therein, the proper control sequence according to the person-transport service out of group 3 is selected and activated, output as signal $S_2$ to control the drive arrangement 11.

A requesting person enters e.g. by keys, or a touch screen or by voice the desired start station START ST as well as the desired destination station DEST. STATION in the communication device 100.

If the requested service defined by desired start station and desired destination station does not belong to one of the group 3 services, the requested service is aborted either already in the communication device 100 or in system control unit arrangement 15.

In the embodiment of FIG. 9 as described up to now the requesting person should know in advance which is the start station optimally situated with respect to their instantaneous position, e.g. nearest by, and must know the identification of such station. The requesting person should also know the identification of the desired destination station. Both are input by the person to the communication device 100. This might cause problems e.g. in a huge building complex, e.g. an airport building complex. So as to help the requesting person in this embodiment to properly select the optimal start station and also to provide information for selecting the desired destination station, the communication device 100 may first send to the stationary interface arrangement 20 a request start signal $S_{RST}$.

Figure 10:
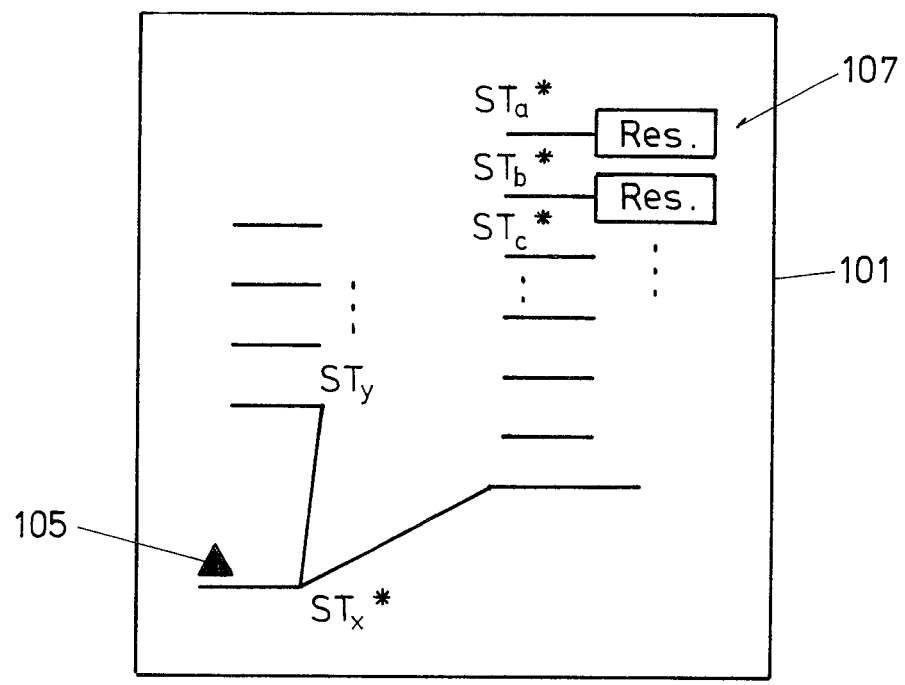
FIG. 10: most schematically the display which may be generated for requesting persons' information by the transport system and according to the embodiment according to FIG. 9, and FIG. 11: in a representation in analogy to that of FIG. 9, a further embodiment of a part of the transport system.

Upon the respective signal $S_{RST}$ in the signal $S_3/S_4$, the system control unit arrangement 15 transmits map-information $S_{map}$ via interface arrangement 20 to the communication device 100. There, on a display 101 the map of the building complex is displayed, according to the information in $S_{map}$ and as schematically shown in FIG. 10. Please note that in this embodiment the operational connections and communications between communication device 100 and stationary interface arrangement 20 as well as between interface arrangement 20 and system control arrangement 15 are bidirectional.

As shown in FIG. 10 the displayed map of the building complex shows the stationary stations $ST_a$, $ST_b$, etc. by such identifications. Already this information may be a great help for the requesting person to properly select the optimum start station and input the destination station so as to select a desired person transport service. In the displayed map those stationary stations which may be requested via the non-touch stationary interface arrangement 20 may be marked, as schematically shown in FIG. 10 by asterisk, so that the requesting person knows which stationary station may be requested in non-touch manner via the stationary interface arrangement 20.

A further embodiment is shown in FIG. 9 by dash lines and includes functional block 103.

In this embodiment there is provided a position-identifying system 103 which identifies the instantaneous position of the requesting person, more accurately of the respective communication device 100. Such position-identifying system 103 may be based on GPS as built in the communication device 100 or may be based on sender devices which are mounted at a multitude of different locations in the building complex and which send position identification information with respect to that location, where they are mounted. Such sender devices (not shown in the figures) may continuously send the location information, which identifies their mounting location or may send such information only if a communication device 100 enters a predetermined local range with respect to such sender device. In any case the communication device 100 receives information about its instantaneous location. This information is either superimposed at the communication device 100 itself to the map information as received from the system control unit arrangement 15 or is transmitted from the communication device 100 via stationary interface arrangement 20 to the system control unit arrangement 15, where such location information is superimposed on the map information.

As shown in FIG. 10, by additionally displaying the location information about a requesting person's momentary position in the map information at the communication device 100, the requesting person may easily select the most suited start station to get the most suited person transport service to a desired destination station. The instantaneous location is marked in FIG. 10 by reference number 105.

As further shown in FIG. 10, additionally to the map of the building complex, wherein the transport system is operated, the system control unit arrangement 15 may provide information 107 about residents or offices directly accessible from respective stationary stations ST. This additionally helps the requesting person to select the proper destination station, knowing primarily to which office or to which resident she desires to go.

Once the requesting person has entered the request signal $S_{SD}$ defining for the desired start station and the desired destination station, the system control unit arrangement 15 may transmit via bidirectional stationary interface arrangement 20 schedule information to the communication device 100, e.g. to be displayed together with the map information and indicating timing information as e.g. how long the requesting person will (in average) take from its instantaneous location 105 to the selected start station and/or when at the selected start station a conveyor will be ready for transport and/or how long it will take to reach the destination station, etc. With an eye on the embodiment of FIGS. 9 and 10 as described to now it may be seen that any person which has a communication device 100 which is constructed or programmed to communicate with the stationary interface arrangement 20 may request a person-transport service. Restriction with respect to services which may be requested is only given by the grouping of such services, i.e. the addressed person may only request those services which are grouped in the third group of services.

In many cases it may be advantageous or desired to restrict the number of persons which may place a service request to specific and entitled persons. To do so an initial authentication procedure may be established between the communication device 100 and the control unit system 15. Such authentication procedure may be realized in a multitude of different ways as perfectly known to the ordinary skilled artisan, e.g. based on a code, unique for a communication device 100 as of a MAC address and/or a code transmitted from the control unit system 15 to the communication device 100 e.g. initiated by a person with which a meeting has been appointed and/or by face recognition, finger print recognition, eye recognition of the service-requesting person, etc.

Whereas we have described by examples and with the help of the FIGS. 9 and 10 embodiments which are based on the fact that by means of the communication device 100 a requesting person defines the requested service by means of a start stationary station and a destination stationary station, a different approach shall now be described, in which the system control unit arrangement 15 proposes or establishes a respective service to fulfil the service needs of a requesting person.

Figure 11:
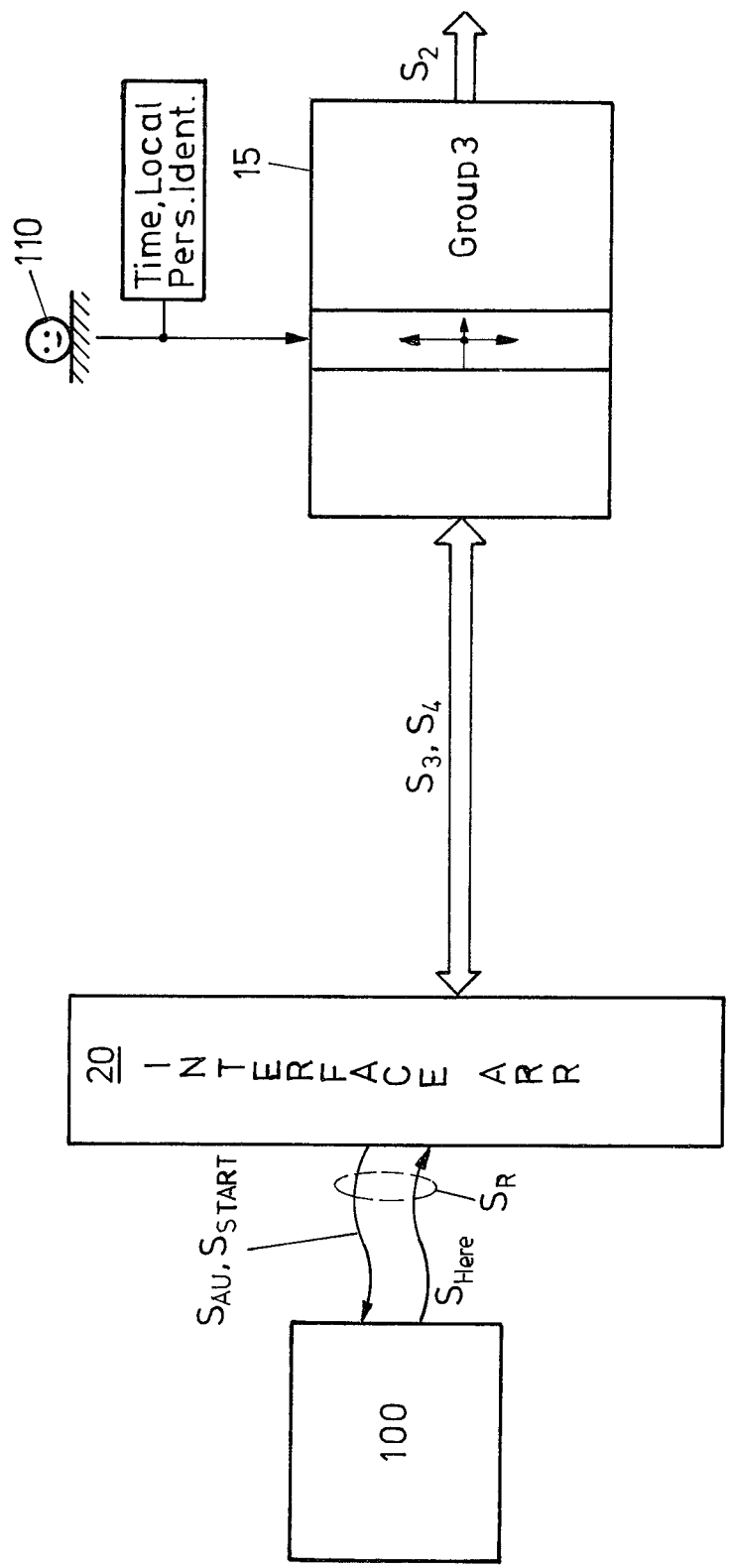

With the help of FIG. 11 an embodiment shall be exemplified in which the transport system selects upon request an appropriate transport service and just informs the person where to access the conveyor arrangement 3.

A person makes a meeting appointment with a person in the building complex, which is served by the transport system 1. This person 110 communicates to the control unit system 15 meeting time, meeting location and e.g. the telephone number of the mobile phone of the requesting person, as an identification of the person to meet. The control unit system 15 transmits via interface arrangement 20 to the mobile phone of the requesting person—which in the example according to FIG. 11 is used as the communication device 100—an authentication information e.g. a code as shown in FIG. 11 by $S_{AU}$. The control unit system 15 further selects that person transport service which is most suited to transport the requesting person to the location where the meeting shall be. Once selected, the control unit system 15 transmits via stationary interface arrangement 20 to the mobile phone of the requesting person which is the communication device 100 a message e.g. an SMS message indicating the starting stationary station $S_{START}$, i.e. the stationary station where the requesting person on its way to the meeting shall access the conveyor arrangement. This is indicated in FIG. 11 by the signal $S_{START}$.

Thereby, in many cases the start stationary station will be the stationary station just at an entrance of the building complex.

Once the requesting person with the communication device 100 and on its way to the meeting approaches the start stationary station, it transmits, via communication device 100, a signal $S_{Here}$ to the stationary interface arrangement 20 indicating that it (the person) is nearby the start stationary station.

Then the control unit system 15 initiates the control sequence to the control drive arrangement 11 as of FIG. 1 which accords with the selected person-transport service and the requesting person is transported by the conveyor arrangement 3 to that destination stationary station nearby the location, where the meeting shall be, in fact without that the requesting person need to know where such destination station is located within the building complex and how transportation will be established.

We have now described a number of different embodiments of the transport system and of the method for controlling such transport system. The ordinary skilled artisan will recognize that there is a huge number of different approaches to realize the addressed transport system and the method of controlling such transport system according to the specific needs of the persons according to the structure of a building complex, security needs with respect to access for which such transport system is to be tailored.

As a communication device 100 and dependent upon the specific layout of the transport system, mobile phones, touch screens, portable or stationary computers etc. may be used. For the communication with the transport system a respective program is loaded into the communication device 100, e.g. a specific APP, in a mobile phone to be used as communication device 100.

The transport system as has been described has, additionally to reducing the risk of infection, the significant advantage, that wherever person-transport services may be exclusively requested by non-touch signals and due to longrange transmission of some type of such signals, as of radio signals, one single interface unit of the stationary interface arrangement 20 can cooperate with a multitude of loci whereat services are requestable. Thus high savings in system complexity and system costs may be achieved, due to the fact that there is no need to provide at such loci wired fixtures i.e. button-touch-request units or at least, that such additionally provided units at the addressed loci may be tailored only for a few functions, whereas most functions are integrated in the communication device 100, as in a mobile phone. Thus the saving of costs for the overall system may be significant.

What is claimed is:

1. A transport system capable of providing transportation between a plurality of stationary stations, comprising:
    at least one conveyor arrangement including a stationary conveyor track and a conveyor movable along said conveyor track;
    a controllable drive arrangement operationally connected to said conveyor arrangement for driving said conveyor or controlling access from said conveyor to said stationary stations;
    a control unit system configured to control said drive arrangement based on signals received at a command input, so that said conveyor arrangement performs a selected service from among a first group of services, said control unit system being further configured with a second group of services, said second group of services being a first subset of said first group of services and generally corresponding to person transport services, said control unit system being further configured with a third group of services which are a second subset of said first group of services and comprising at least a majority of the second group of person transport services which are performed based on nontouch request signals; and
    a stationary interface arrangement having an input configured to receive nontouch request signals from a user of the transport system.

2. The transport system of claim 1, wherein said nontouch request signals include signal generation using a user device, acoustic signals, or electromagnetic signals.

3. The transport system of claim 1, wherein said third group of nontouch person transport services comprises at least 90% of said second group of services.

4. The transport system of claim 1, further comprising a portable communication device for use by said user to communicate with the stationary interface arrangement.

5. The transport system of claim 4, further comprising a position identification unit configured to provide position information of said portable communication device.

6. The transport system of claim 5, wherein said position information is instantaneous position information and is used by the control unit system to select a particular transport service from among said group of services.

7. The transport system of claim 1, wherein said conveyor arrangement includes an elevator, a band conveyor, an escalator or a door with a controllable drive for opening and closing the door.

8. A method of controlling a transport system capable of providing transportation between a plurality of stationary stations by way of a conveyor arrangement including a stationary conveyor track and a conveyor movable along said track, comprising the following steps:
    using a controllable drive arrangement operationally connected to said conveyor arrangement to drive said conveyor or control access from said conveyor to said stationary stations;
    using a control unit system configured to control said drive arrangement based on signals received at a command input, so that said conveyor arrangement performs a selected service from among a first group of services, said control unit system being further configured with a second group of services, said second group of services being a first subset of said first group of services and generally corresponding to person transport services, said control unit system being further configured with a third group of services which are a second subset of said first group of services and comprising at least a majority of the second group of person transport services which are performed based on nontouch request signals; and
    receiving by way of a stationary interface arrangement, nontouch request signals from a user of the transport system.

9. The method of claim 8, wherein said nontouch request signals include signal generation using a user device, acoustic signals, or electromagnetic signals.

10. The method of claim 8, wherein said third group of nontouch person transport services comprises at least 90% of said second group of services.

11. The method of claim 8, further comprising using a portable communication device by said user to communicate with the stationary interface arrangement.

12. The method of claim 11, further comprising providing position information of said portable communication device using a position identification unit.

13. The method of claim 12, wherein said position information is instantaneous position information and is used by the control unit system to select a particular transport service from among said group of services.

14. The method of claim 8, wherein said conveyor arrangement includes an elevator, a band conveyor, an escalator or a door with a controllable drive for opening and closing the door.

* * * * *